(12) United States Patent  
Clemenceau et al.

(10) Patent No.: US 8,230,394 B2
(45) Date of Patent: Jul. 24, 2012

(54) MANAGING DATA SETTINGS IN A COMPUTER OPERATING SYSTEM

(75) Inventors: Matthieu Clemenceau, Saint Michel des Loups (FR); Emmanuel Ledoux, Granville (FR); Stephane Durand, Le Val Saint Pere (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1326 days.

(21) Appl. No.: 11/867,029

(22) Filed: Oct. 4, 2007

(65) Prior Publication Data

US 2008/0086719 A1 Apr. 10, 2008

(30) Foreign Application Priority Data

Oct. 6, 2006 (EP) .................................... 06291563

(51) Int. Cl.
*G06F 9/44* (2006.01)
*G06F 9/45* (2006.01)
(52) U.S. Cl. .................... 717/121; 717/120; 717/124
(58) Field of Classification Search ........... 717/120–129
See application file for complete search history.

(56) References Cited

U.S. PATENT DOCUMENTS

| | | | | |
|---|---|---|---|---|
| 5,379,427 A * | 1/1995 | Hiroshima | ................... | 717/124 |
| 6,536,036 B1 * | 3/2003 | Pavela | ....................... | 717/125 |
| 6,678,882 B1 * | 1/2004 | Hurley et al. | ................... | 717/121 |
| 6,983,449 B2 * | 1/2006 | Newman | ..................... | 717/121 |
| 7,103,874 B2 * | 9/2006 | McCollum et al. | ........... | 717/121 |
| 7,278,133 B2 * | 10/2007 | Roman et al. | ................ | 717/120 |
| 7,404,180 B2 * | 7/2008 | Wedel et al. | ................... | 717/128 |
| 7,584,382 B2 * | 9/2009 | Verbowski et al. | ............. | 714/33 |
| 7,594,220 B2 * | 9/2009 | Kodosky et al. | .............. | 717/125 |
| 7,631,299 B2 * | 12/2009 | Kannenberg | ................... | 717/121 |
| 7,707,278 B2 * | 4/2010 | Tafazolli et al. | .............. | 709/221 |
| 7,735,062 B2 * | 6/2010 | de Seabra e Melo et al. | | 717/120 |
| 7,739,677 B1 * | 6/2010 | Kekre et al. | .................... | 717/168 |
| 7,757,211 B2 * | 7/2010 | Jordan et al. | ................... | 717/120 |
| 7,765,525 B1 * | 7/2010 | Davidson et al. | ............. | 717/124 |
| 7,886,278 B2 * | 2/2011 | Stulski | .......................... | 717/127 |
| 7,900,201 B1 * | 3/2011 | Qureshi et al. | ................ | 717/174 |
| 7,979,840 B2 * | 7/2011 | Zhang et al. | .................. | 717/104 |
| 8,151,247 B2 * | 4/2012 | Wefers | .......................... | 717/124 |
| 8,181,157 B2 * | 5/2012 | Ericsson et al. | .............. | 717/123 |

OTHER PUBLICATIONS

Xing et al, "The testing and evaluating system for the secure operating system based on the mechanism of keyword driven", IEEE, pp. 471-474, 2009.*

(Continued)

*Primary Examiner* — Anil Khatri (57) ABSTRACT

Data settings in a computer operating system are managed. The operating system includes sets of specific instructions (30-33), such as plugins, for managing configurations of software components (35) intended to run on the computer entity. A modification of settings required by an external program (20,21) involves a modification of configuration of the software components (35), through related plugins (30-33). The operating system is architected so as to include a repository (40,41) storing data of settings, and a main program (10) having access to the repository in read and write modes. Upon request from an external program for modifying settings, the main program (10) is adapted for transmitting the request to the plugins, receiving from at least one plugin a response including an information of modification of settings required by the external program, and, upon verification of the information, validating the modification of settings and updating related data in said repository.

17 Claims, 2 Drawing Sheets

OTHER PUBLICATIONS

Gonzalez et al, "Google fusion tables: web centred data management and collaboration", ACM SIGMOD, pp. 1061-1066, 2010.*

Friedrich et al, "Mata data version and configuration management in multi vendor environments", ACM SIGMOD, pp. 799-804, 2005.*

Song et al, "A case for scaling applications to many core with OS clustering", ACM EuroSys, pp. 61-75, 2011.*

European Patent Office, App. No. 06291563.2, Communication under Rule 71(3) EPC, Jul. 3, 2009.

* cited by examiner

MANAGING DATA SETTINGS IN A COMPUTER OPERATING SYSTEM

BACKGROUND OF THE INVENTION

The present invention is related to the management of an operating system of a computer entity, and more particularly to the management of data of settings of such an operating system.

An operating system comprises several independent software components. These software components are in charge of:
  managing the computer entity hardware, and
  managing the computer entity network services and/or providing high level user interface programs.

Most of these software components have their own settings and own running behaviours. Usually, the software component settings are stored in a standard text file. Some of these software components may provide a graphical user interface to allow a user to configure the settings of the software components.

In order to manage the operating system (for example a thin client operating system), an end user should be provided with:
  several Graphical User Interfaces (or "GUI") for configuring the computer entity hardware and/or the Operating System (or "OS") program services,
  the ability to configure the OS by different means:
    using a GUI available on the OS,
    using an existing network management protocol (for example SNMP),
    using a proprietary network management tool,
  the ability to extract the OS configuration and to import it on another OS.

Any provided program (including the so-called "GUI" programs) for configuring the OS directly can update each software component configuration file and then restart the corresponding software component with the settings based on the configuration chosen by the end user.

Then, all provided programs or GUI needing to update a software component have to know:
  an address of the configuration file of this software component,
  how this software component should be restarted,
  and which other dependent software component needs to be updated also.

A first difficulty is met in integrating heterogeneous components into an OS. Software components have to be updated or even sometimes be replaced by other software components. Consequently, any program in charge of configuring this software component has to be updated also because configuration files path are deprecated. Software component behaviour could also change. Moreover, usual integrators or administrators may not have access to configuration program sources.

A second difficulty is met in centrally managing heterogeneous component settings. Each software component has its own configuration file and several programs could exist to configure one same software component. So each of these programs can have its own way to edit and update one software component configuration file. Moreover, two configuration programs can have access to the same software component configuration file at the same time which can lead to data corruption.

A third difficulty is met in handling interactions between all software components. An operating system, in the end, comprises a multiplicity of software components and configuration programs. Because interactions and dependencies between software components can be managed in several places, some software components may be not synchronized with their configuration files. Settings required by an end user may not be applied to all software components.

The present invention aims to improve the situation.

BRIEF SUMMARY OF THE INVENTION

To this end, it proposes a method for managing data of settings in an operating system of a computer entity.

According to the invention, the operating system includes a plurality of sets of specific instructions for managing configurations of the software components intended to run on the computer entity. Therefore, a modification of settings required by an external program involves a modification of a configuration of the software components, through related specific instructions.

Furthermore, a repository storing data of settings, and a main program having access to the repository in read and write modes, is provided.

Upon request from an external program for modifying settings, the main program is adapted for:
  transmitting the request to the sets of specific instructions,
  receiving from at least one of the sets of specific instructions a response including an information of modification of settings required by the external program,
  upon verification of the information based on at least one criterion, validating said modification of settings and updating related data in the repository.

The present invention aims also a computer program, comprising instructions for the implementation of the method, as the aforesaid "main program". The invention aims also a data storing media, comprising program code instructions of such a computer entity program.

In an embodiment, the aforesaid "at least one criterion" is whether the information of modification of settings has a correct type of data.

In a same embodiment or in an alternative embodiment, a further verification can be performed on the request itself and may comprise a test of regular expression of the request.

In a preferred embodiment, the architecture of the cooperation between the main program and the external programs substantially corresponds to a client/server architecture.

Thus, the main program comprises preferably a server program adapted for reading and/or writing data in said repository, while said external programs act as "client" programs.

In this preferred embodiment, the main program comprises an application program interface (or "API") for providing an interface between the client programs and the server program. Advantageously, the application program interface includes a list of possible commands related at least to the reading and writing of the repository. In an embodiment where a buffer is further provided for temporarily storing modification of settings data before updating the repository content, the list of commands may include a confirmation of changing the repository (e.g. a "commit" type command), and also a rollback command.

In a specific embodiment, the aforesaid "server" program comprises a daemon type program and each of the sets of specific instructions defines a plugin type program, added to the daemon and being arranged for cooperating with the daemon.

It is reminded that a "plugin" is an auxiliary program, interacting with a program (here the daemon) in order to provide new functionalities to that program. More particularly, a plugin comprises code instructions that the program (the daemon) can read and run. It is also reminded that a "DAEMON" (for "Disk And Execution MONitor") is a program that is not invoked explicitly, but lies "dormant" waiting for at least one condition to occur. An external program, perpetrator of the condition, does not need to be aware that a daemon is present, though often a program will commit an action only because it knows that it will implicitly invoke a daemon. For example, "unix" systems run many daemons, chiefly to handle requests for services from other hosts on a network. Most of these are started as required by a single daemon, rather than running continuously. The daemon according to the invention follows thus the analogy with a client/server architecture.

The operating system according to the invention can be advantageously a LINUX® type operating system, and a single repository of settings is further provided for storing all the settings of the software components, making it possible to manage an equivalent of a registry of settings in such a LINUX® type operating system. It is reminded that such a registry of settings is a specific element of a WINDOWS® type operating system, and is not provided however in a usual LINUX® type operating system. Moreover, the repository (storing the settings) can advantageously be a simple XML file.

Here, the daemon of the invention is preferably adapted for cooperating with the plugins, as follows:
  the daemon transmits a request from an external program to the plugins,
  if one or several plugins are concerned by the content of the request, they answer to the daemon with a response including information of modification of settings according to the request.

Therefore, thanks to the implementation of the invention, administrators, integrators and developers have a standard and reliable way of interfacing a software component in an operating system, simply by writing sets of specific instructions (or "plugins" hereafter).

By providing their own settings, the plugins provide a virtualization of software component settings management. Configuration programs do not directly change software component settings but only plugin settings. Therefore, such plugins can update software component settings according to their own settings.

By providing an intermediate program (the so-called "main program" according to the invention), the invention ensures an exclusive access to data of settings, accorded to the main program. Indeed, in an advantageous embodiment of the invention, the main program has an exclusive access to the settings repository. Thus, any configuration program can have access to settings data only through the main program.

Using the main program according to the invention also ensures having only one way to change settings for the operating system.

Because each plugin is in charge of a part of the central repository of settings, it is possible to use the main program to centrally manage heterogeneous software components settings through the management of the related plugins' own settings.

Moreover, the invention provides a central data repository which makes the operating system configuration available in only one location (for example a memory address), which is well defined.

In an embodiment, if several external programs require modifications of common settings, the main program is adapted for notifying these external programs of changes in common parts of the repository. Thus, each software component or associated program is able to know whether it should restart or change its state. Such an embodiment makes it possible to react on any change of settings or a part of settings in the repository. Configuration programs are just in charge of their own configuration settings and do not need to know which software component is in charge of which settings nor which software component has to be updated.

BRIEF DESCRIPTION OF THE SEVERAL VIEWS OF THE DRAWINGS

Other characteristics and advantages of the invention will become apparent on examining the detailed specification hereafter, and the appended drawings in which.

DETAILED DESCRIPTION OF THE INVENTION

Figure 1:
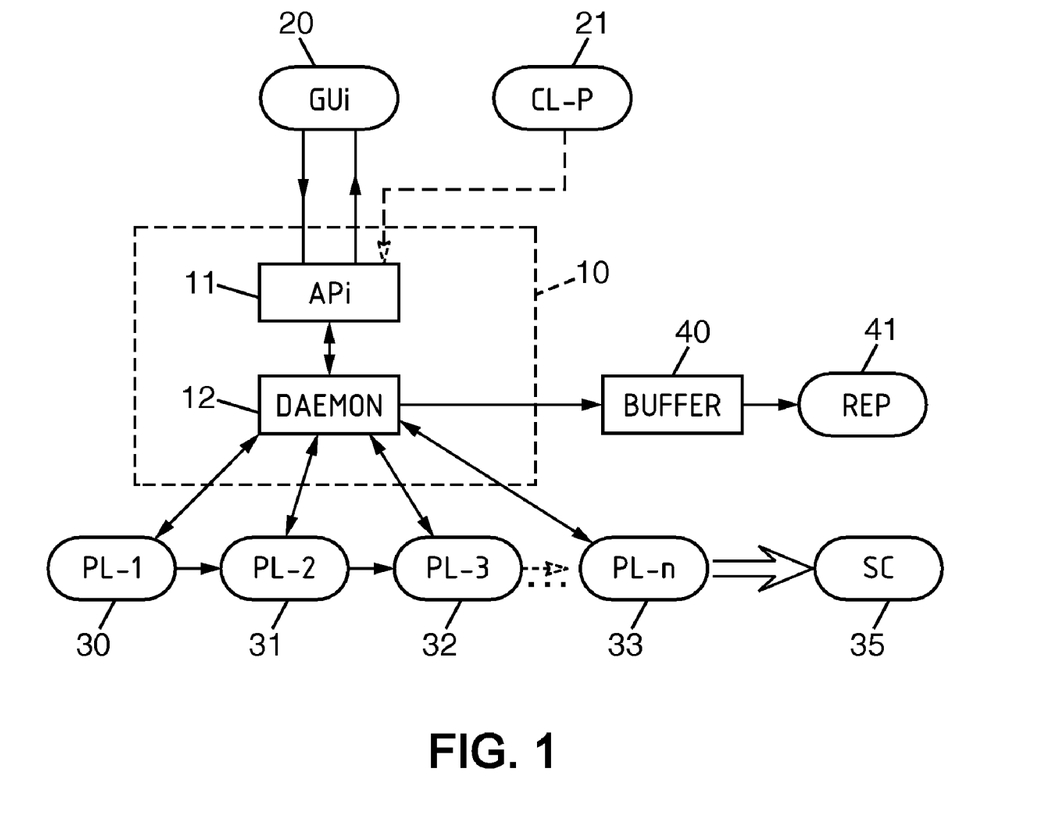
FIG. 1 illustrates an example of the main architecture of the operating system according to the invention.

With reference to FIG. 1, the main program 10, of an operating system according to the invention, comprises:
  an application program interface (or "API") 11, receiving from external programs 20,21 a request for changes of settings of software components 35 of the operating system, and
  a daemon 12 for transmitting this request to plugins 30, 31, 32, 33.

In the client/server architecture of FIG. 1, the external programs 20,21 can be considered as client programs and, for example, can be a graphical user interface (or "GUI") 20.

If the requested changes of settings are validated, they are stored in a buffer 40. If they are further confirmed, the settings are then stored in a repository 41, for instance an XML file.

Figure 2:
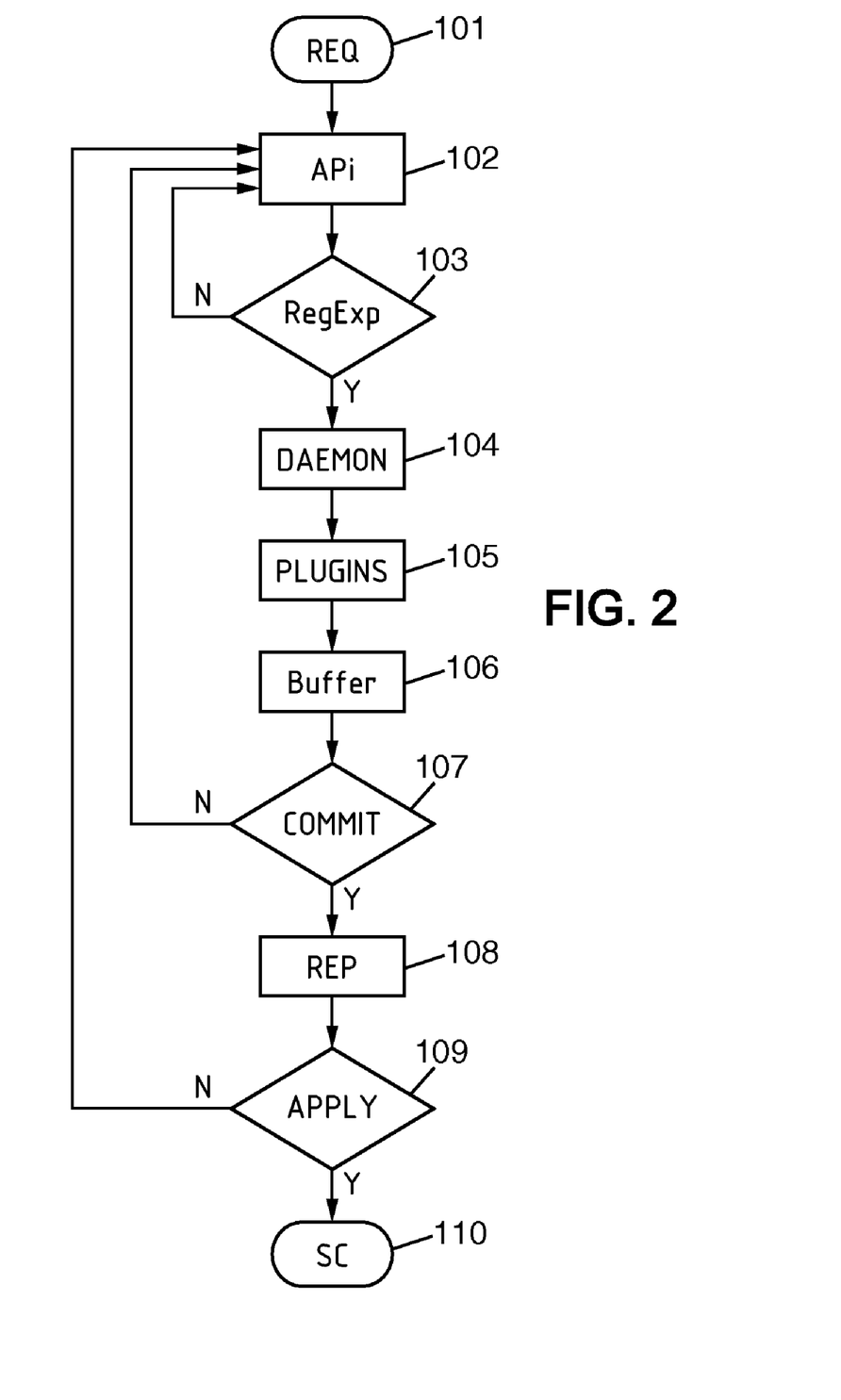
FIG. 2 illustrates an example of operation of the architecture of FIG. 1, for illustrating steps of the method according to the invention.

In a general embodiment, when the API 11 receives from a client program 20 a request of change of settings, the API 11 checks the request (for example its expression in the test 103 of FIG. 2 described hereafter). If the request is valid, it is transmitted to the daemon 12. The request comprises an indication (a key value and/or a file path) allowing the daemon 12 to know which plugin or plugins may be concerned by the request. The plugins 30-33 are considered as extensions added to the daemon 12. Each plugin comprises a set of instructions which are necessary:
  to verify the content and the parameters of a request (for example a key value and/or a file format),
  to redefine key values of a registry (as like a WINDOWS® key registry),
  to modify the settings of the software components of the operating system that are related to the changes required in the request.

One such plugin can be related to settings aiming the desktop configuration (for example a background image of the desktop which appears on the screen). Another such plugin can be related to settings aiming a modem configuration, or any other peripherals. Another such plugin again can be related to any internal settings of the computer entity.

When the daemon 12 receives a request from the API, it (12) consults each plugin 30-33 and the plugins concerned by the request are run. To that end, the request may comprise an indication of a file path to one or several "concerned plugins", for example. More particularly, specific instructions of the concerned plugins can be run in response to a command sent form a client program 20 to the API 11, during their dialogue. Such a command is also indicated in the request sent to the daemon 12.

A non exhaustive list may include the following possible commands:
- "set" (corresponding to a request for checking the validity of changes of settings in a request and for temporarily storing validated data in a buffer 40),
- "commit" (for confirming changes of key values in a registry corresponding here to the repository 41),
- "rollback" (the opposite to the "commit" command, to avoid any effective modification of the repository 41),
- "import" (for importing for example the content of an external repository in the repository 41 of FIG. 1),
- "export" (for exporting the content of the repository 41 of FIG. 1 in an external repository),
- "get" (for enabling a client program to know a key value in the repository 41),
- "apply" (to effectively apply the changes stored in the repository 41 to the software components 35),
- "watch" (to notify the changes in the repository 41 to the client programs 20,21).

When the daemon 12 receives a request from the API with one of the commands given above, it (12) runs the instructions related to that command, those instructions being contained in the "concerned plugins". For example, if a request comprises the command "set" and asks for a modification of a background image in a desktop configuration. The daemon 12 runs a plugin related to the desktop configuration and, more particularly, a set of instructions of this plugin specifically to answer to the command "set". The daemon, running the specific instructions of the "desktop plugin", may for example:
- check the format of a new image (intended to replace a former image),
- check also a new key value in the request, etc.

If the result of the checking is positive (meaning that the modifications asked in the request are valid and can be applied), the daemon 12 stores the checked data in the buffer 40 and replies to the API that the modifications can be done.

If the daemon receives a request comprising a "commit" command for the same modification of the background image in the desktop configuration, the daemon runs the instructions of the "desktop" plugin related to the "commit" command and stores the key values validated in the buffer 40 in the repository 41.

If the daemon receives a request comprising an "apply" command for the same modification of the background image in the desktop configuration, the daemon runs the instructions of the "desktop" plugin related to the "apply" command for modifying effectively the settings of the software components 35.

Therefore, the API 11 is provided for the client programs 20,21 to communicate with the daemon 12. The API provides also a way for a client program, or a group of client programs 20,21, to be notified of changes in selected parts of the repository 41. The API includes a reduced set of commands to easily comply with the software implementation of the main program 10.

Moreover, the content of a request can be checked by the API 11 with a regular expression test ("RegExp") in order to validate or reject data of the request. The "RegExp" evaluation must be successful for allowing any setting to be written into the buffer 40. In case of rejection, a mechanism can be provided to supply a default data or an adapted data.

Requests of settings are stored in the volatile buffer 40 before being committed to the repository 41. Therefore, a rollback (command "Rollback") is possible until modifications are effectively committed (command "Commit"). "Rollback" and "Commit" commands can be done on one setting or on a group of settings.

The notification mechanism (answer to a "Watch" command) is preferably based on a "TCP socket" application (for "Transmission Control Protocol"). The daemon runs locally like a server and listens for socket access. It can be used also remotely by third party software (for instance Altiris™ or any other asset management tool).

Only one client program 20, at a time, can access the settings in the repository 41 via the API 11. In the example of FIG. 1, the client program 21 shall wait (dashed line between boxes 21 and 11) for the end of process of the request sent by the client program 20.

The API 11 can be compiled in C++, C or Bash language.

The daemon 12 has an exclusive access to the repository 41, to read and write its content, through a "default" plugin 33 (noted pl-n on FIG. 1). The default plugin 33 cooperates with the main program 10 (API and daemon) and is provided in particular for managing changes in the buffer 40 or in the repository 41.

Practically, such a "default" plugin 33 can be simply a routine contained in the daemon 12 itself. However, implementing a separate plugin for managing changes in the buffer and, more particularly, in the repository, may be more advantageous in order to control the operation of the main program according to the invention and its plugins. Moreover, the specific instructions to run for answering different requests can be gathered in a same plugin or in distinct plugins. The gathering of the sets of instructions per plugins can be controlled according to an optimum of operation of the operating system or according to a particular choice of an administrator of the operating system.

The plugins 30-32 are in charge of updating the operating system and its software components 35. A first function of the daemon 12 is to provide support for the plugins 30-32.

The plugins are made of a shared library (for instance a ".so" file of a dynamic library) and, advantageously, include a set of default settings 33 (for instance an XML file). The common plugins 30-32 implement a specific interface to be compliant with the main program 10. The default plugin 33 can be used as an interpreter of self made script based plugins. The default plugin 33 can be used each time default settings are used and no other processing is needed. This avoids the need to develop executable binary plugins for simple cases of default settings. In more general terms, a predetermined set of settings is further provided with the plugins for defining default settings of the software components 35.

Plugins can override any API command in order to change the default behaviour of the API. The plugins thus provide an interface between the settings of the repository 41 and the configuration of the related software components 35, for instance, for creating a configuration file or for restarting programs (as it will be described in more detail further in the present specification). To ease the management of configuration files of the software component 35, templates can be provided in an additional library. For instance, templates of the type "smb.conf.in" can be processed to generate a final library smb.conf. The templates can be customized in order to modify generated files without modifying executable parts of the related plugins. The templates provide for example keywords to access registry values and/or conditional tests.

Access rights can be associated to the settings in the repository 41. At least a part of the content of the repository 41 can include settings preferred by a first identified user of the computer entity running the OS of the invention, while access to this part of the repository is disabled for another user (having for example lower access rights).

The settings chosen by a user are preferably stored in a non-volatile memory of the computer entity, while at least current settings of computer entity components (for example peripherals) are preferably stored in a volatile memory.

With reference now to FIG. 2, a request for changing settings in the operating system is sent by a client program (step 101) and received by the API (step 102). A test (step 103) for checking the validity of the request is performed (for example a RegExp type test, and other possible tests described later on). If the request is not valid (arrow N from test 103), the request is rejected. Otherwise (arrow Y from test 103), the request 101 is valid and its content is sent to the daemon program (step 104) which broadcasts the request to the plugins (step 105). As it will be described in detail in an example of implementation hereafter, the request comprises a key (for example, in some cases, a file path leading to the concerned plugins) for enabling the concerned plugins to reply to the daemon. Amongst the plugins, the default plugin pl-n can be considered as the plugin which can be used for managing any modification in the buffer 40 or in the repository 41. The plugin pl-n temporarily stores the required change of settings in the buffer 40 (step 106). The main program 10 (through the API 11) asks the user (through the client program 20) a confirmation for executing the request ("commit" command and test 107 of FIG. 2). If the execution of the request is indeed wished (arrow Y from test 107), the key values of the repository 41, at least, are replaced by the key values stored in the buffer 40 (step 108). Otherwise (arrow N from test 107), the dialogue between the API 11 and the client program 20 may continue with a message of abandonment sent by the API 11 (which situation may correspond to a "rollback" command).

Upon an "apply" command (step 109), the settings defined in the repository 41 are finally applied to the concerned software components (step 110), by reloading configuration files of the software components or, alternatively, by restarting them (depending on the mode of modification of each software components). Otherwise (arrow N from test 109), the main program 10 may wait for an appropriate moment for applying the required changes.

An example of implementation of the invention is given below, in an application for managing settings related to a desktop "look and feel" of a screen display of a computer unit.

A plugin related to the desktop settings is provided, according to the invention, and is able to cooperate with a daemon 12. This plugin is a program designed to be globally compliant with the main program 10 of the invention. Its goal is to manage every setting related to desktop look and feel (image, icons, etc). It is provided with its own default settings, for example according to a simple routine or "default key" comprising the following instructions:
    os/desktop/background
        value=/etc/default.jpg
        type=string
        RegExp=

In this example, the client program 20 is a proprietary graphical user interface (GUI) designed to allow the user to change desktop settings. Using a control-panel client program, the user selects a new background image path with a file browser widget. While cooperating with the API 11, the control-panel program tries to propose new values for the desktop background, for example a desktop plugin background key, such as:
    set os/desktop/background new-image.jpg The "set" request, through a TCP type protocol, reaches the daemon program 12. As a server, the daemon 12 broadcasts the request to all the plugin programs 30-33.

At least one of these plugins and more particularly a desktop plugin (called through the key "os/desktop/background") preferably checks the key, for example with the following tests:
    "does the file exist?"
    "does the jpg image have a valid size?"

If the desktop plugin (carrying for example the reference 30 of FIG. 1) rejects the key modification, it sends back an error code. The API 11 informs the client program 20 of the rejection (through the aforesaid "control panel" program). If the desktop plugin 30 accepts the change of settings, the "set" request is sent to a next plugin 31, until the last plugin pl-n. Preferably, the last plugin (reference 33 of FIG. 1) is a "default" plugin. The default plugin adds the "set" request to the registry buffer 40. Then, an "acknowledge of receipt" of the request is sent to the GUI 20 (during a dialogue between the API 11 and the client program 20). The GUI 20 then knows that the value entered by the user is correct and that the request can be committed. While cooperating with the API 11, the GUI 20 can commit the previous key, slightly modified:
    commit os/desktop/background new-image.jpg The daemon 12 broadcasts the commit request to all the plugins 30-33. The commit request arrives to the default plugin 33 which transfers the key "os/desktop/background" to the buffer 40. The registry buffer 40 contains this key. It updates an XML registry object which automatically gets synchronized with the XML repository file of settings 41.

Then, the modified key os/desktop/background is returned to a "Watch Notification" routine which checks whether a client program is watching for changes on its key: "os/desktop/background". Each client program 20,21 watching for change on this key is then notified consequently.

When the command "apply" is executed, the content of the repository 41 is effectively applied to the software components 35 concerned by the new settings. In the example given above, a software component 35 can be a desktop manager.

In a first example of embodiment, the desktop manager 35 can be an "open source" program which allows to manage desktop feature such as:
    desktop background image,
    desktop icons,
    desktop start menu.

Then, the desktop manager has its own configuration file (desktop.cfg) which contains the desktop manager settings for background, icons and start menu.

The user may simply click with his mouse on an icon called "apply settings". Dialoguing with the API 11, the control panel program asks the desktop plugin 30 for an update of the software components 35 (including the aforesaid desktop manager), which are concerned by the key:
    apply os/desktop The daemon 12 broadcasts the set request to all plugins and the related desktop plugin 30 aimed in the key: "os/desktop keys" intercepts the apply request. Then, the desktop plugin 30:
    updates the desktop manager 35 (more particularly the "desktop.cfg" configuration file) with the latest settings stored in the XML Registry Object.
    asks the desktop manager 35 to reload its configuration file or, alternatively, restarts the desktop manager program.

In a second example of an embodiment, to be considered as an alternative to the first example of an embodiment, the desktop manager 35 is intentionally designed as a client program being able to cooperate with the main program 10 according to the invention and more particularly with the daemon 12. The desktop manager, on a start-up, creates a watch request on keys such as:

os/desktop/background watch os/desktop/background

The daemon 12 broadcasts a watch request to all the plugins. Then, the watched key is added to a "Watch Notification" file containing the information that the desktop manager program is watching for changes on a key:

os/desktop/background

If any change occurs on the key os/desktop/background, the desktop manager is notified and can withdraw then any current desktop background.

Of course, the present invention is not limited to the embodiment described above by way of example. It extends rather to other variants, however within the scope of the claims hereafter.

What is claimed is:

1. A method of managing data settings of an operating system of a computer entity, comprising by the computer entity executing a main program component of the operating system and one or more sets of specific instructions of the operating system to perform operations comprising:

by execution of the main program component of the operating system, receiving from an external program a request comprising one or more commands and settings data for a proposed modification of configuration settings of a target software component of the operating system intended to run on the computer entity, wherein the configuration settings are stored in a repository, and a plurality of external programs share configuration settings in the repository;

by execution of the main program component of the operating system, determining from the request one or more sets of specific instructions of the operating system designated for responding to the one or more commands in the request;

by execution of the one or more determined sets of specific instructions, validating the proposed modification of the configuration settings of the software component required by the external program based on at least one criterion and, responsive to a successful validation of the proposed modification of the configuration settings of the software component, producing a response comprising an implementation of the proposed modification of the configuration settings of the software component;

by execution of the main program component of the operating system, receiving the response and updating the configuration settings of the target software component in the repository based on the implementation of the proposed modification; and by execution of the main program component, notifying the plurality of external programs of changes in the shared configuration settings in the repository.

2. The method as set forth in claim 1, wherein the at least one criterion is whether proposed modification has a correct type of data.

3. The method as set forth in claim 2, further comprising by the computer entity validating the request itself based on a test of regular expression of the request.

4. The method as set forth in claim 1, wherein the main program component of the operating system has exclusive access to the repository.

5. The method as set forth in claim 1, wherein said main program component of the operating system comprises a server program adapted for at least one of reading and writing data in the repository, and the external program operate as client programs that are served by the server program.

6. The method as set forth in claim 5, wherein said main program component of the operating system comprises an application program interface providing an interface between external programs and the server program.

7. The method as set forth in claim 6, wherein the application program interface includes a list of commands related to reading and writing data to the repository.

8. The method as set forth in claim 7, further comprising:

by the main program component of the operating system to temporarily store the implementation of the proposed modification in a buffer; and responsive to receipt of a confirmation for storing data of said buffer in the repository from the external program, by the main program component of the operating system to update the configuration settings of the target software component in the repository with the implementation of the proposed modification stored in the buffer.

9. The method as set forth in claim 5, wherein the server program comprises a daemon program, and each of the sets of specific instructions defines a respective plugin program that cooperates with the daemon program.

10. The method as set forth in claim 9, wherein the daemon prom is adapted for:

broadcasting the request from the external program to said plugin programs, and receiving the response from at least one plugin program determined to be related to the request.

11. The method as set forth in claim 1, wherein the updating of the configuration settings of the target software component in the repository comprises executing a set of specific instructions of the operating system that perform the updating of the configuration settings of the target software component in the repository.

12. The method as set forth in claim 1, wherein a predetermined set of settings is further provided with the sets of specific instructions for defining default settings of the software components.

13. The method as set forth in claim 1, wherein the operating system is a LINUX® type operating system, and all the settings of the software components are stored in the repository.

14. The method as set forth in claim 1, wherein the repository is an XML file.

15. The method as set forth in claim 1, wherein at least a part of the repository comprises settings preferred by a first identified user of the computer entity, and further comprising by the main program component of the operating s stem to disable access to the part of the repository for a second user different from the first identified user.

16. The method as set forth in claim 15, wherein execution of the main program component of the operating system disables access by storing the part of the repository in a non-volatile memory of the computer entity, and storing at least current settings of computer entity components in a volatile memory.

17. At least one non-transitory computer-readable medium having computer-readable program code embodied therein for managing data settings of an operating system of a computer entity, the computer-readable program code adapted to be executed by the computer entity to execute a main program component of the operating system and one or more sets of specific instructions of the operating system to perform operations comprising:

by execution of the main program component of the operating system, receiving from an external program a request comprising one or more commands and settings data for a proposed modification of configuration settings of a target software component of the operating system intended to run on the computer entity, wherein the configuration settings are stored in a repository, and a plurality of external programs share configuration settings in the repository;

by execution of the main program component of the operating system, determining from the request one or more sets of specific instructions of the operating system designated for responding to the one or more commands in the request;

by execution of the one or more determined sets of specific instructions, validating the proposed modification of the configuration settings of the software component required by the external program based on at least one criterion and, responsive to a successful validation of the proposed modification of the configuration settings of the software component, producing a response comprising an implementation of the proposed modification of the configuration settings of the software component;

by execution of the main program component of the operating system, receiving the response and updating the configuration settings of the target software component in the repository based on the implementation of the proposed modification; and by execution of the main program component, notifying the plurality of external programs of changes in the shared configuration settings in the repository.

* * * * *

UNITED STATES PATENT AND TRADEMARK OFFICE
CERTIFICATE OF CORRECTION

| | |
|---|---|
| PATENT NO. | : 8,230,394 B2 |
| APPLICATION NO. | : 11/867029 |
| DATED | : July 24, 2012 |
| INVENTOR(S) | : Matthieu Clemenceau et al. |

It is certified that error appears in the above-identified patent and that said Letters Patent is hereby corrected as shown below:

In column 10, line 23, in Claim 10, delete "prom" and insert -- program --, therefor.

In column 10, line 47, in Claim 15, delete "s stem" and insert -- system --, therefor.

Signed and Sealed this
Nineteenth Day of February, 2013

Teresa Stanek Rea
*Acting Director of the United States Patent and Trademark Office*